US012527719B2

(12) United States Patent
Zhao et al.

(10) Patent No.: US 12,527,719 B2
(45) Date of Patent: Jan. 20, 2026

(54) HOT TUB WALL JET NOZZLE

(71) Applicant: Guangzhou Rising Dragon Recreation Industrial Co., Ltd., Guangzhou (CN)

(72) Inventors: Huaibin Zhao, Guangzhou (CN); Xuewen Liu, Guangzhou (CN)

(73) Assignee: GUANGZHOU RISING DRAGON RECREATION INDUSTRIAL CO., LTD., Guangzhou (CN)

( * ) Notice: Subject to any disclaimer, the term of this patent is extended or adjusted under 35 U.S.C. 154(b) by 110 days.

(21) Appl. No.: 18/731,378

(22) Filed: Jun. 3, 2024

(65) Prior Publication Data

US 2025/0177245 A1 Jun. 5, 2025

(30) Foreign Application Priority Data

Nov. 30, 2023 (CN) ......................... 202323263668.9

(51) Int. Cl.
*A61H 33/02* (2006.01)
*A61H 33/00* (2006.01)

(52) U.S. Cl.
CPC ....... *A61H 33/027* (2013.01); *A61H 33/6052* (2013.01); *A61H 33/6063* (2013.01)

(58) Field of Classification Search
CPC .............. A61H 33/027; A61H 33/6052; A61H 33/6063
USPC .......................................................... 4/541.6
See application file for complete search history.

(56) References Cited

U.S. PATENT DOCUMENTS

| | | | | |
|---|---|---|---|---|
| 6,691,336 B2 * | 2/2004 | Buck | B05B 3/0425 | 239/383 |
| 6,904,626 B1 * | 6/2005 | Hester | A61H 33/027 | 239/599 |
| 8,869,320 B1 * | 10/2014 | Santamarina | B05B 1/08 | 239/589.1 |
| 2005/0039251 A1 * | 2/2005 | Colin | A61H 33/027 | 4/541.6 |
| 2025/0107955 A1 * | 4/2025 | Zhao | A61H 33/027 | |
| 2025/0107962 A1 * | 4/2025 | Zhao | A61H 33/027 | |
| 2025/0107966 A1 * | 4/2025 | Zhao | A61H 33/6063 | |

* cited by examiner

*Primary Examiner* — Huyen D Le
(74) *Attorney, Agent, or Firm* — Frank Niranjan

(57) ABSTRACT

A hot tub wall jet nozzle includes a nozzle body and a nozzle core seat. Water flows from the water inlet into the water flow channel in the nozzle body. Air enters through the air inlet of the nozzle body and reaches the first air accommodating cavity, then flows from the first air accommodating cavity to the second air accommodating cavity, and the air from the second air accommodating cavity is then mixed with the water in the nozzle core seat at the water outlet under the Venturi effect, and the mixed water and air flow is finally discharged through the water outlet. This structural arrangement allows for reduced dilution and loss of air bubbles during water flow transmission. The Venturi effect produced in this nozzle is capable of generating a greater volume of air ejection, thus enhancing the strength and effectiveness of the massage.

10 Claims, 7 Drawing Sheets

HOT TUB WALL JET NOZZLE

TECHNICAL FIELD

The present invention relates to the technical field of hot tubs, in particular to a hot tub wall jet nozzle.

BACKGROUND

In modern society, with the increasing pursuit of quality of life, leisure and relaxation have become more and more important. As a way to enjoy comfort and health, hot tub massage has received widespread attention and love. Hot tub massage can relieve physical fatigue, promote blood circulation and improve psychological comfort, thus achieving the effect of stress relief and health promotion.

The hot tub has a hot tub back wall allowing the user to lean on, which is usually equipped with hot tub wall jet nozzles. However, although the traditional hot tub wall jet nozzle has certain advantages in providing comfortable bubble massage experience, its design limitations are gradually emerging. The hot tub wall jet nozzle includes a nozzle core seat with a water inlet and an air inlet. The distance between the water inlet and the air inlet of the traditional hot tub wall jet nozzle is relatively short, which may lead to a relatively long air injection path after the water enters the nozzle. This may cause the air bubbles to be easily diluted in the process of water flow transmission, and some air bubbles may merge or disappear on the way, thus reducing the density and quality of the air bubbles. Due to the poor stability of air bubbles, in use, the traditional back wall nozzle may have the issues of intermittent air bubbles and producing a mere trickle of water, which may affect the consistency and comfort of massage effect. Users may feel that the massage is weak at some body areas, or the users are even unable to feel the stimulation of air bubble massage and, as a result, uniform massage effect throughout the body cannot be achieved. This further reduces the overall quality of the massage experience.

Therefore, the design limitations in the traditional hot tub wall jet nozzles limit the effect and stability of bubble massage, which is also a problem that people have been trying to solve in the nozzle field.

SUMMARY

The present invention is directed to a hot tub wall jet nozzle, which solves some limitations existing in the traditional design to provide a better and more stable hot tub massage experience.

A hot tub wall jet nozzle is provided, which includes a nozzle body and a nozzle core seat. The nozzle body is provided with a water inlet and an air inlet, and an end of the nozzle body is opened, into which the nozzle core seat is inserted. The nozzle core seat includes a core seat body and a nozzle cover arranged at an end of the core seat body. The core seat body is provided with a water flow channel communicating with two ends of the core seat body. An end of the water flow channel is connected with the water inlet, and the other end of the water flow channel is hermetically connected with the nozzle cover, and the nozzle cover is provided with a water outlet. A first air accommodating cavity is formed between the nozzle body and the nozzle core seat, a second air accommodating cavity is formed between the core seat body and the nozzle cover, and the first air accommodating cavity and the second air accommodating cavity are communicated through a core seat air hole arranged at a side of the core seat body close to the nozzle cover.

Preferably, the nozzle core seat further includes a nozzle core, and the nozzle core is arranged on a side of the water flow channel near the nozzle cover, and the nozzle cover surrounds an outside of the nozzle core, with a gap formed between the nozzle cover and the nozzle core, and a plurality of water outlet holes are arranged on the nozzle core.

In some embodiments, the water outlet holes are arranged along a long strip.

Further, a first fastening structure is provided for fastening the nozzle core and the nozzle core seat. Preferably, the first fastening structure includes a plurality of first installation catches arranged on the side of the nozzle core, and a plurality of first installation slots arranged on an inner side of the nozzle core seat. The first installation catches are engaged into the first installation slots, so that the nozzle core is installed at the long opening structure of the nozzle core seat. When the nozzle core is installed, the open end of the long opening structure of the nozzle core seat is sealed, so that water can be discharged from the water outlet holes provided on the nozzle core. Of course, the first fastening structure can also be in the form of screws, rivets, elastic fasteners or the like, which will not be described in detail here.

In some embodiments, the nozzle core and the nozzle cover are provided with a second fastening structure for fastening the nozzle core and the nozzle cover. Preferably, the second fastening structure includes a plurality of second installation catches arranged on an upper portion of the side of the nozzle core and a plurality of second installation slots arranged at an inner side the nozzle cover, and the second installation catches are engaged into the second installation slots, so that the nozzle cover surrounds the outside of the nozzle core. Similarly, the second fastening structure can also be in the form of screws, rivets, elastic fasteners or the like, which will not be described herein.

In some embodiments, the nozzle body and the nozzle cover are provided with a third fastening structure for fastening the nozzle body and the nozzle cover. Specifically, the third fastening structure includes a plurality of screw holes and a plurality of screws arranged on the nozzle body. The screws pass through screw openings arranged on the nozzle cover and are screwed into the screw holes arranged on the nozzle body, thereby realizing the tight connection between the nozzle body and the nozzle cover, such that the nozzle core seat can be securely arranged in the nozzle body. The detachable connection method as described above also facilitates the maintenance of the nozzle core seat. It should be noted that the third fastening structure can also be in the form of snap-fits, rivets, elastic fasteners or the like, which will not be described in detail here.

Preferably, the core seat body includes a long opening seat with a U-shaped cross section and with an open end, and a columnar body; and the columnar body is hollow inside and is arranged at one end of the long opening seat opposite from the open end of the long opening seat.

Preferably, a water inlet tube connected with the water inlet is arranged inside the nozzle body, and an end of the core seat body away from the nozzle cover is inserted into the water inlet tube.

Preferably, an outer side of the end of the core seat body away from the nozzle cover is provided with an annular accommodating groove, and an annular rubber ring is arranged in the annular accommodating groove.

Preferably, a nozzle surface cover is further provided, and the nozzle surface cover is arranged on a side of the nozzle cover away from the core seat body.

Preferably, a decorative ring is further provided, and the decorative ring is arranged on a peripheral side of the nozzle cover by snap-fit.

Compared with the traditional design, the present invention provides a hot tub wall jet nozzle, which includes a nozzle body and a nozzle core seat. When the hot tub wall jet nozzle is used, water enters from the water inlet, and then flows into the water flow channel in the nozzle body. At the same time, air enters through the air inlet of the nozzle body and reaches the first air accommodating cavity, the air then flows from the first air accommodating cavity to the second air accommodating cavity through the core seat air hole, and then the air from the second air accommodating cavity is mixed with the water in the nozzle core seat at the water outlet under the Venturi effect, and the mixed water and air flow is finally discharged through the water outlet, thus realizing the water spraying in a manner in which the water and the air are first separately introduced into the hot tub wall jet nozzle, and subsequently the air is sucked to mix with the water under the Venturi effect. This structural arrangement allows for reduced dilution and loss of air bubbles during water flow transmission, such that dense air bubbles can be created in the water flow, which are guided by the water outlet and released along a specific area of the hot tub. The Venturi effect produced in this nozzle is capable of generating a greater volume of air ejection, thus enhancing the strength and effectiveness of the massage, which makes the massage more powerful and stimulating to better relieve muscle fatigue and stress, providing a richer and denser bubble massage experience. Therefore, the massage effect of the hot tub wall jet nozzle is comprehensively improved. By strengthening the massage effect, providing a full-body massage, and improving the stability and durability, the hot tub wall jet nozzle can provide the users with a better massage experience and better comfort and relaxation.

REFERENCE NUMERALS

Figure 1:
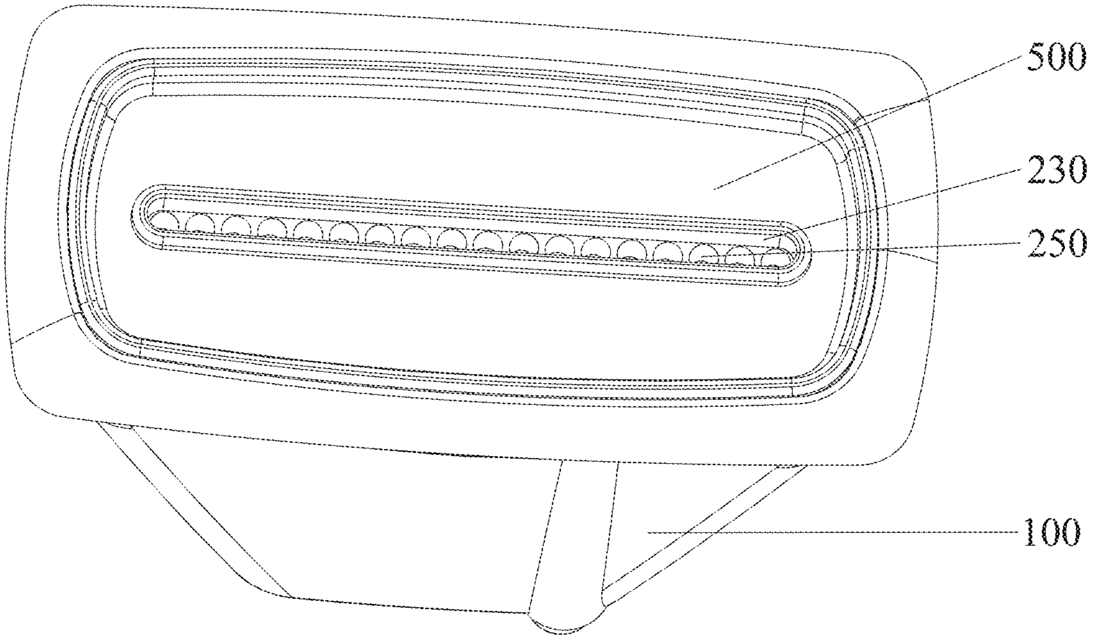
FIG. 1 is a perspective view of a hot tub wall jet nozzle according to one embodiment of the present invention.

100—Nozzle body, 200—Nozzle core seat, 110—Water inlet, 120—Air inlet, 130—Core seat air inlet, 140—Water inlet tube, 150—First installation slot, 160—Screw installation hole, 210—Core seat body, 220—Nozzle cover, 221—Second installation slot, 230—Water outlet, 240—Nozzle core, 250—Water outlet hole, 260—Annular accommodating groove, 270—Annular rubber ring, 280—First installation catch, 290—Second installation catch, 300—First air accommodating cavity, 400—Second air accommodating cavity, 500—Nozzle surface cover, 600—Decorative ring, 700—Screw.

DESCRIPTION OF EMBODIMENTS

In order to make objectives, technical solutions and advantages of the embodiments of the present invention clearer, the technical solutions of the embodiments of the present invention will be described clearly and completely below with reference to the accompanying drawings in the embodiments of the present invention.

Referring to FIG. 1 to FIG. 7, this embodiment provides a hot tub wall jet nozzle, which includes a nozzle body 100 and a nozzle core seat 200. The nozzle body 100 is provided with a water inlet 110 and an air inlet 120, and one end of the nozzle body 100 is opened, into which the nozzle core seat 200 is inserted. The nozzle core seat 200 includes a core seat body 210 and a nozzle cover 220 arranged at one end of the core seat body 210. The core seat body 210 is provided with a water flow channel communicating with two ends of the core seat body 210. One end of the water flow channel is connected with the water inlet 110, and the nozzle cover 220 is hermetically connected to the other end of the water flow channel. The nozzle cover 220 is provided with a water outlet 230, a first air accommodating cavity 300 is formed between the nozzle body 100 and the nozzle core seat 200, and a second air accommodating cavity 400 is formed between the core seat body 210 and the nozzle cover 220. The first air accommodating cavity 300 and the second air accommodating cavity 400 communicate with each other through a core seat inlet hole 130 arranged at a side of the core seat body 210 close to the nozzle cover 220.

Figure 2:
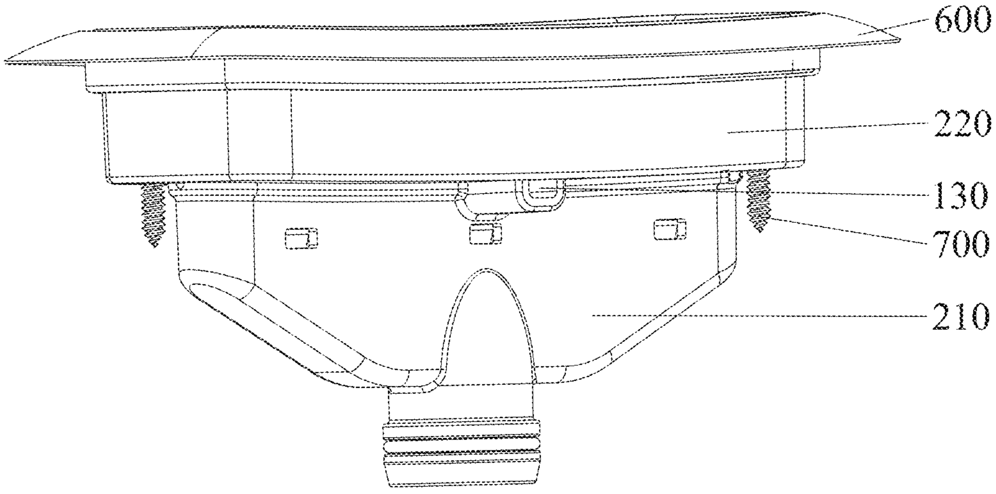
FIG. 2 is a side view showing some parts of the hot tub wall jet nozzle of FIG. 1.
Figure 6:
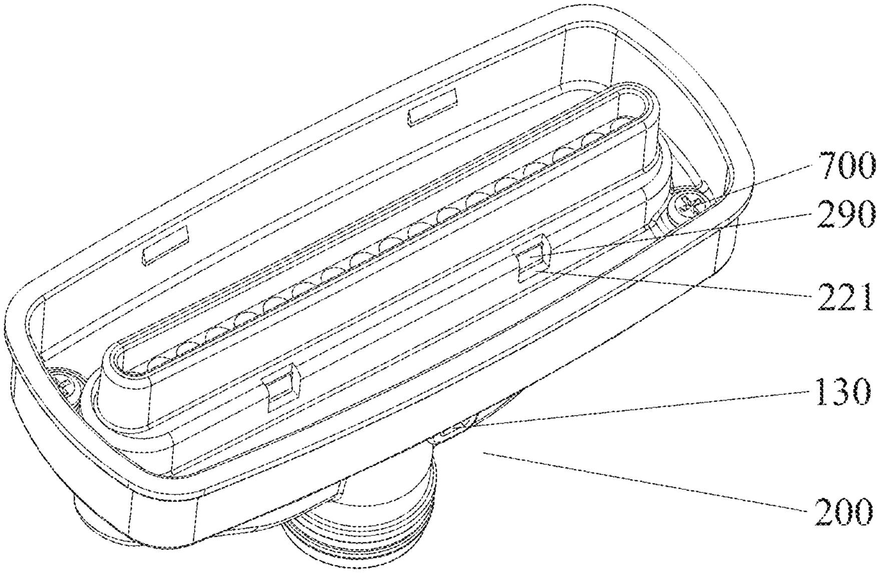
FIG. 6 is a perspective view of a nozzle core seat of the hot tub wall jet nozzle of FIG. 1.
Figure 7:
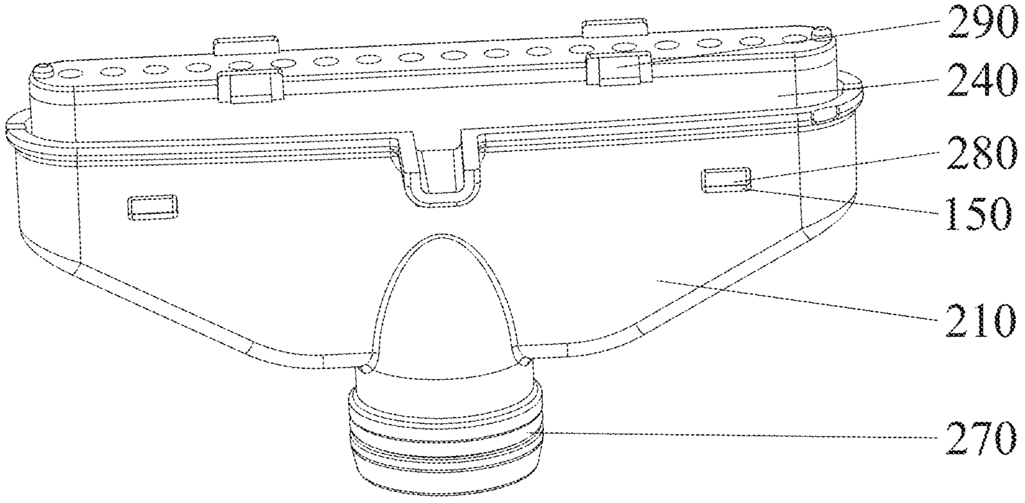
FIG. 7 is a perspective view showing some parts of the nozzle core seat of FIG. 7.

Referring to FIG. 2, FIG. 6 and FIG. 7, it should be noted that in this embodiment, the core seat body 210 includes a long opening seat with a U-shaped cross section and with an open end, and a columnar body. The columnar body is hollow inside and is arranged at one end of the long opening seat opposite from the open end of the long opening seat. A nozzle core 240 is arranged at the long opening seat, the nozzle cover 220 surrounds an outside of the nozzle core 240, with a gap formed between the nozzle core 240 and the nozzle cover 220, and this gap forms a second air accommodating cavity 400. The nozzle core 240 is provided with a plurality of water outlet holes 250 facing the water outlet 230. In this embodiment, the water outlet 230 is configured as a long strip-shaped water outlet 230. Further, a plurality of the water outlet holes 250 are arranged along a long strip. Preferably, the water outlet holes 250 can be arranged along a straight strip, so that the waterflow out of the nozzle can have a long strip-shaped cross section.

Referring to FIG. 7, in this embodiment, a first fastening structure is provided for fastening the nozzle core 240 and the nozzle core seat 200. Specifically, the first fastening structure includes a plurality of first installation catches 280 arranged on the side of the nozzle core 240 and a plurality of first installation slots 150 arranged on an inner side of the nozzle core seat 200. The first installation catches 280 are engaged into the first installation slots 150, so that the nozzle core 240 is installed at the long opening structure of the nozzle core seat 200. When the nozzle core 240 is installed, one end of the long opening structure of the nozzle core seat 200 is sealed, so that water can be discharged from the water outlet holes 250 provided on the nozzle core 240. Of course, the first fastening structure can also be in the form of screws, rivets or the like, which will not be described in detail here.

Referring to FIGS. 6 and 7, preferably, the nozzle core 240 and the nozzle cover 220 are provided with a second fastening structure for fastening the nozzle core 240 and the nozzle cover 220. The second fastening structure includes a plurality of second installation catches 290 arranged on an upper portion of the side of the nozzle core 240 and a plurality of second installation slots 221 arranged at an inner side the nozzle cover 220, and the second installation catches 290 are engaged into the second installation slots 221, so that the nozzle cover 220 surrounds the outside of the nozzle core 240. Similarly, the second fastening structure can also be in the form of screws, rivets, elastic fasteners or the like, which will not be described in detail here.

Preferably, the nozzle body 100 and the nozzle cover 220 are provided with a third fastening structure for fastening the nozzle body 100 and the nozzle cover 220. Specifically, the third fastening structure includes a plurality of screw holes 160 and a plurality of screws 700 arranged on the nozzle body 100. The screws 700 pass through screw openings arranged on the nozzle cover 220 and are screwed into the screw holes 160 arranged on the nozzle body 100, thereby realizing the tight connection between the nozzle body 100 and the nozzle cover 220, such that the nozzle core seat 200 can be securely arranged in the nozzle body 100. The detachable connection method as described above also facilitates the maintenance of the nozzle core seat 200. It should be noted that the third fastening structure can also be in the form of snap-fits, rivets, elastic fasteners or the like, which will not be described in detail here.

Figure 3:
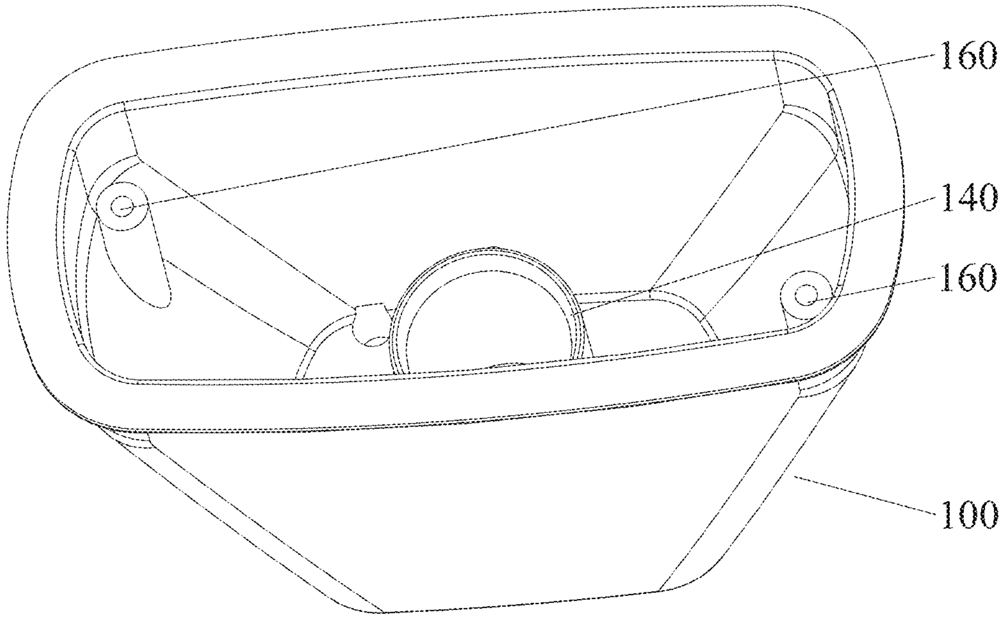
FIG. 3 is a perspective view of a nozzle body of the hot tub wall jet nozzle of FIG. 1.
Figure 4:
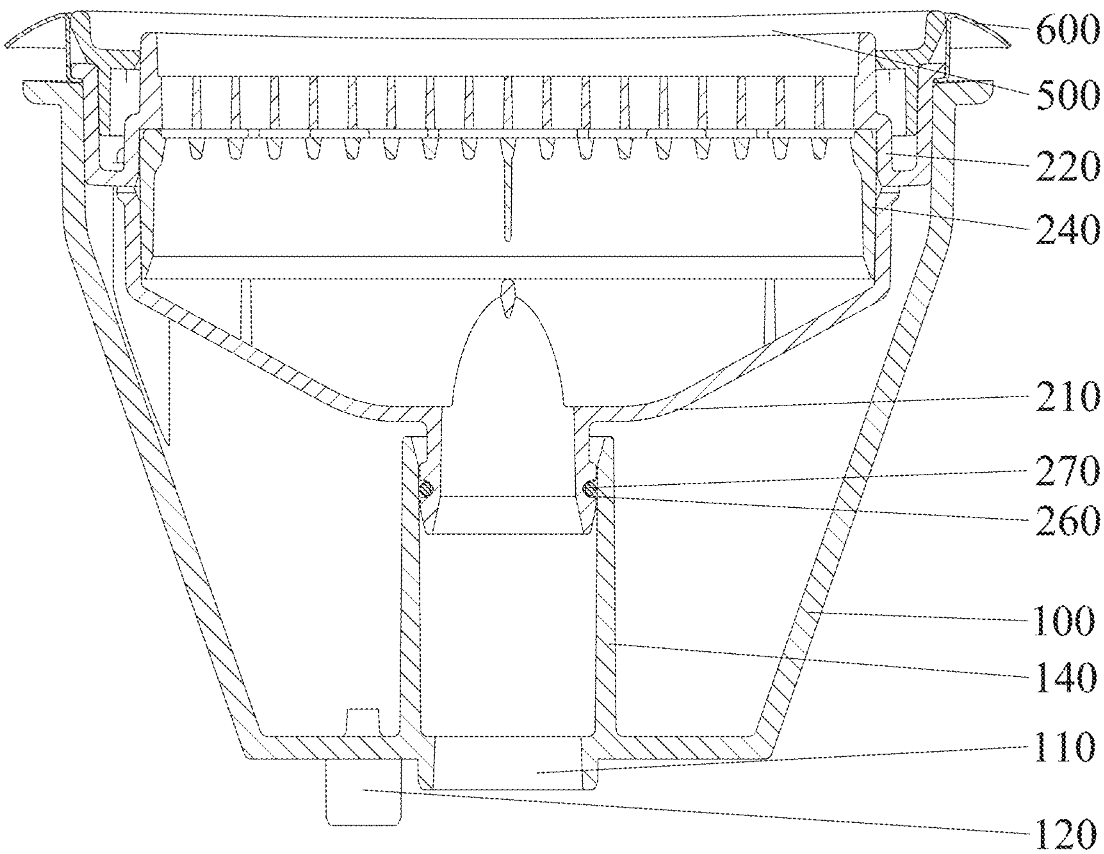
FIG. 4 is a vertical cross-sectional view of the hot tub wall jet nozzle of FIG. 1.
Figure 5:
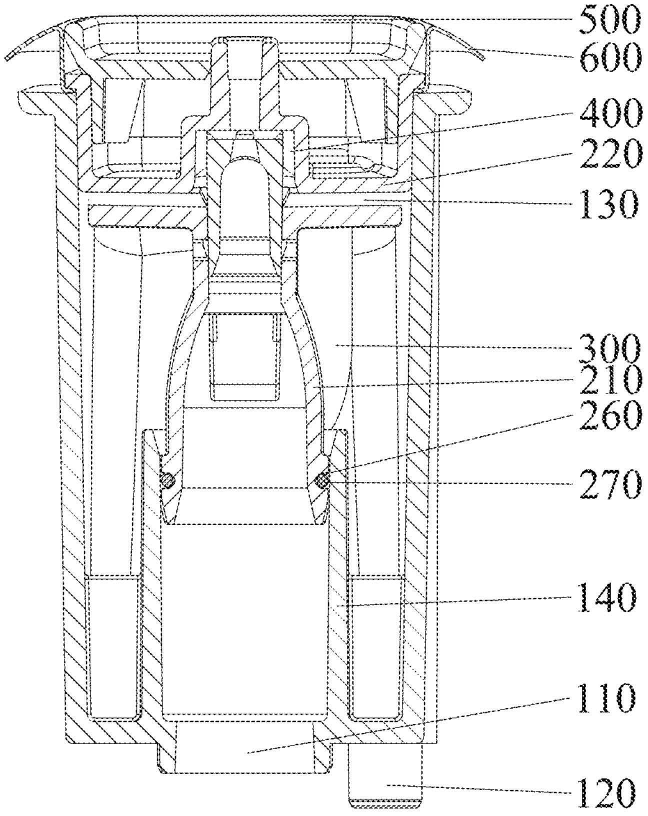
FIG. 5 is another vertical cross-sectional view of the hot tub wall jet nozzle of FIG. 1, taken along another vertical plane.

Referring to FIG. 3, FIG. 4 and FIG. 5, preferably, a water inlet tube 140 connected with the water inlet 110 is arranged inside the nozzle body 100. One end of a cylindrical structure of the core seat body 210 away from the nozzle cover 220 is inserted into the water inlet tube 140. Further, an outer side of the end of the core seat body 210 away from the nozzle cover 220 is provided with an annular accommodating groove 260, and an annular rubber ring 270 is provided in the annular accommodating groove 260. With the annular rubber ring 270 compressed against an inner surface of the water inlet tube 140, the water inlet tube 140 is tightly connected with one end of the cylindrical structure of the core seat body 210, thereby preventing water from overflowing into the first air accommodating cavity 300.

It should be noted that, during installation, the nozzle core 240 is installed at the long strip-shaped opening structure of the nozzle core seat 200, and then the nozzle cover 220 is attached around the outside of the nozzle core 240. Then, one end of the cylindrical structure of the nozzle core seat 200 is pressed to be inserted into the water inlet tube 140 arranged inside the nozzle body 100. At this time, the annular rubber ring 270 is compressed against the inner surface of the water inlet tube 140, forming a tight connection between the cylindrical structure of the nozzle core seat 200 and the water inlet tube 140. Afterwards, the screws 700 pass through screw openings of the nozzle cover 220 and are screwed into the screw holes 160 of the nozzle body 100 to mount the nozzle cover 220 to the nozzle body 100, with the nozzle core seat 200 being installed in the nozzle body 100.

Referring to FIG. 1, FIG. 4 and FIG. 5, it is preferred to further include a nozzle cover 500. The nozzle surface cover 500 is arranged on a side of the nozzle cover 220 away from the core seat body 210. The nozzle surface cover 500 is mounted to the nozzle cover 220 by snap-fit.

Referring to FIG. 1, FIG. 4 and FIG. 5, it is preferred to further include a decorative ring 600, and the decorative ring 600 is mounted on a peripheral side of the nozzle cover 220 by snap-fit.

When the hot tub wall jet nozzle provided by this embodiment is used, water enters from the water inlet 110, and then flows into the water flow channel in the nozzle body 210. At the same time, air enters through the air inlet 120 of the nozzle body 100 and reaches the first air accommodating cavity 300, the air then flows from the first air accommodating cavity 300 to the second air accommodating cavity 400 through the core seat air hole 130, and then the air from the second air accommodating cavity 400 is mixed with the water in the nozzle core seat 200 at the water outlet 230 under the Venturi effect, and the mixed water and air flow is discharged through the water outlet 230, such that the water can be sprayed out in a manner in which the water and the air are first separately introduced into the hot tub wall jet nozzle, and subsequently the air is sucked to mix with the water under the Venturi effect.

Therefore, the above embodiment provides a hot tub wall jet nozzle with a structural arrangement that allows for reduced dilution and loss of air bubbles during water flow transmission, such that dense air bubbles can be created in the water flow, which are guided by the water outlet 230 and released along a specific area of the hot tub. The Venturi effect produced in this nozzle is capable of generating a greater volume of air ejection, thus enhancing the strength and effectiveness of the massage, which makes the massage more powerful and stimulating to better relieve muscle fatigue and stress, providing a richer and denser bubble massage experience. Therefore, the massage effect of the hot tub wall jet nozzle is comprehensively improved. By strengthening the massage effect, providing a full-body massage, and improving the stability and durability, the hot tub wall jet nozzle can provide the users with a better massage experience and better comfort and relaxation.

The above are only the preferred embodiments of this disclosure and do not therefore limit the patent scope of this disclosure. And equivalent structure or equivalent process transformation made by the specification and the drawings of this disclosure, either directly or indirectly applied in other related technical fields, shall be similarly included in the patent protection scope of this disclosure.

What is claimed is:

1. A hot tub wall jet nozzle, comprising a nozzle body and a nozzle core seat, wherein the nozzle body is provided with a water inlet and an air inlet, and an end of the nozzle body is opened, into which the nozzle core seat is inserted; the nozzle core seat comprises a core seat body and a nozzle cover arranged at an end of the core seat body; the core seat body is provided with a water flow channel communicating with two ends of the core seat body; an end of the water flow channel is connected with the water inlet, and the other end of the water flow channel is hermetically connected with the nozzle cover, and the nozzle cover is provided with a water outlet; a first air accommodating cavity is formed between the nozzle body and the nozzle core seat, a second air accommodating cavity is formed between the core seat body and the nozzle cover, and the first air accommodating cavity and the second air accommodating cavity are communicated through a core seat air hole arranged at a side of the core seat body close to the nozzle cover.

2. The hot tub wall jet nozzle according to claim 1, wherein the nozzle core seat further comprises a nozzle core, and the nozzle core is arranged on a side of the water flow channel near the nozzle cover, and the nozzle cover surrounds an outside of the nozzle core, with a gap formed between the nozzle cover and the nozzle core, and a plurality of water outlet holes are arranged on the nozzle core.

3. The hot tub wall jet nozzle according to claim 2, wherein the plurality of water outlet holes is arranged along a long strip.

4. The hot tub wall jet nozzle according to claim 2, wherein a first fastening structure is provided for fastening the nozzle core and the nozzle core seat, and a second fastening structure is provided for fastening the nozzle core and the nozzle cover.

5. The hot tub wall jet nozzle according to claim 1, wherein a third fastening structure is provided for fastening the nozzle body and the nozzle cover.

6. The hot tub wall jet nozzle according to claim 1, wherein the core seat body comprises a long opening seat with a U-shaped cross section and with an open end, and a columnar body; and the columnar body is hollow inside and is arranged at one end of the long opening seat opposite from the open end of the long opening seat.

7. The hot tub wall jet nozzle according to claim 1, wherein a water inlet tube connected with the water inlet is arranged inside the nozzle body, and an end of the core seat body away from the nozzle cover is inserted into the water inlet tube.

8. The hot tub wall jet nozzle according to claim 7, wherein an outer side of the end of the core seat body away from the nozzle cover is provided with an annular accommodating groove, and an annular rubber ring is arranged in the annular accommodating groove.

9. The hot tub wall jet nozzle according to claim 1, further comprising a nozzle surface cover, wherein the nozzle surface cover is arranged on a side of the nozzle cover away from the core seat body.

10. The hot tub wall jet nozzle according to claim 1, further comprising a decorative ring, and the decorative ring is arranged on a peripheral side of the nozzle cover by snap-fit.

* * * * *